(12) United States Patent
Quinn et al.

(10) Patent No.: US 7,814,431 B1
(45) Date of Patent: Oct. 12, 2010

(54) METHOD AND SYSTEM FOR PREDICTIVE FORM COMPLETION

(75) Inventors: Chris Quinn, San Diego, CA (US);
Kenichi Mori, Carlsbad, CA (US);
Justin C. Marr, San Diego, CA (US);
Anthony Creed, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 619 days.

(21) Appl. No.: 11/796,309

(22) Filed: Apr. 27, 2007

(51) Int. Cl.
*G06F 3/048* (2006.01)
*G06F 3/01* (2006.01)

(52) U.S. Cl. .................. 715/804; 715/751; 715/811

(58) Field of Classification Search ................ 715/224, 715/223, 221, 804, 744
See application file for complete search history.

(56) References Cited

U.S. PATENT DOCUMENTS

2003/0033193 A1* 2/2003 Holloway et al. ............ 705/10

OTHER PUBLICATIONS

"Discover Music with a Little Help from the Fans", Last.fm, www.last.fm/tour/discover, Jan. 1, 2007, 1 page.
"About Last.fm", Last.fm-, www.last.fm/about, Jan. 1, 2007, 1 page.
"Pandora®", © 2005-2007 Pandora Media, Inc., Jan. 1, 2007, 1 page.
"About Pandora®", www.pandora.com/corporate, Jan. 1, 2007, 2 pages.
"Pandora and Last.fm: Nature vs. Nurture in Music Recommenders", www.stevekrause.org/steve_krause_blog/2006/01/pandora_and_las.html, Feb. 1, 2007, 34 pages.

* cited by examiner

*Primary Examiner*—Namitha Pillai
(74) *Attorney, Agent, or Firm*—Osha • Liang LLP

(57) ABSTRACT

A method for completing a form including selecting a first topic appearing on the form, receiving a first panel within a graphical user interface (GUI), where the first panel is associated with the first topic and is used to complete a section of the form, assigning a first panel relevance rating to the first panel, supplying a response to the first panel, receiving a second panel predicted based on the first topic and the first panel relevance rating, assigning a second panel relevance rating to the second panel, and receiving the section of the form after the section is completed based on the response to the first panel.

13 Claims, 6 Drawing Sheets

METHOD AND SYSTEM FOR PREDICTIVE FORM COMPLETION

BACKGROUND

Organizations of all types (e.g., corporations, non-profit groups, academic institutions, government bodies, households, individuals, trusts, estates, and/or other entities) and individuals associated with these organizations are required to complete forms. In some cases, these forms are completed on an infrequent basis (e.g., once during the life of the organization). In other cases, these forms are completed on a frequent basis (e.g., annually, semi-annually, quarterly, and/or other periods of time).

Often, a form may be used to report one or more topics (e.g., financial topics, maintenance topics, and/or other topics). In other words, one or more topics may appear on a form to convey information. A form may be any number of pages long and may be divided into multiple sections, with each section pertaining to one or more topics. Because organizations and individuals are usually different, not all topics are applicable to a given organization or individual. In other words, not all organizations or individuals require the same type or depth of information.

SUMMARY

In general, in one aspect, the invention relates to a method for completing a form. The method comprising selecting a first topic appearing on the form, receiving a first panel within a graphical user interface (GUI), where the first panel is associated with the first topic and is used to complete a section of the form, assigning a first panel relevance rating to the first panel, supplying a response to the first panel, receiving a second panel predicted based on the first topic and the first panel relevance rating, assigning a second panel relevance rating to the second panel, and receiving the section of the form after the section is completed based on the response to the first panel.

In general, in one aspect, the invention relates to a method for completing a form. The method comprising receiving a selected first topic appearing on the form, displaying a first panel within a graphical user interface (GUI), where the first panel is associated with the selected first topic and is used to complete a section of the form, receiving a first panel relevance rating assigned to the first panel, collecting a response to the first panel, predicting a second panel based on the selected first topic and the first panel relevance rating, receiving a second panel relevance rating assigned to the second panel, and completing the section of the form based on the response to the first panel.

In general, in one aspect, the invention relates to a computer readable medium. The computer readable medium storing instructions for completing a form, the instructions comprising functionality to receive a selected first topic appearing on the form, display a first panel within a graphical user interface (GUI), where the first panel is associated with the selected first topic and is used to complete a section of the form, receive a first panel relevance rating assigned to the first panel, collect a response to the first panel, predict a second panel based on the selected first topic and the first panel relevance rating, receive a second panel relevance rating assigned to the second panel, and complete the section of the form based on the response to the first panel.

In general, in one aspect, the invention relates to a system for completing a form. The system comprising a panel repository configured to supply a first panel and a second panel associated with a topic appearing on the form, a mapping agent operatively connected to the panel repository and configured to predict the second panel using a mapping rule and a first panel relevance rating assigned to the first panel, and a form generator configured to complete a section of the form based on a first response associated with the first panel and a second response associated with the second panel.

Other aspects of the invention will be apparent from the following description and the appended claims.

DETAILED DESCRIPTION

Figure 1:
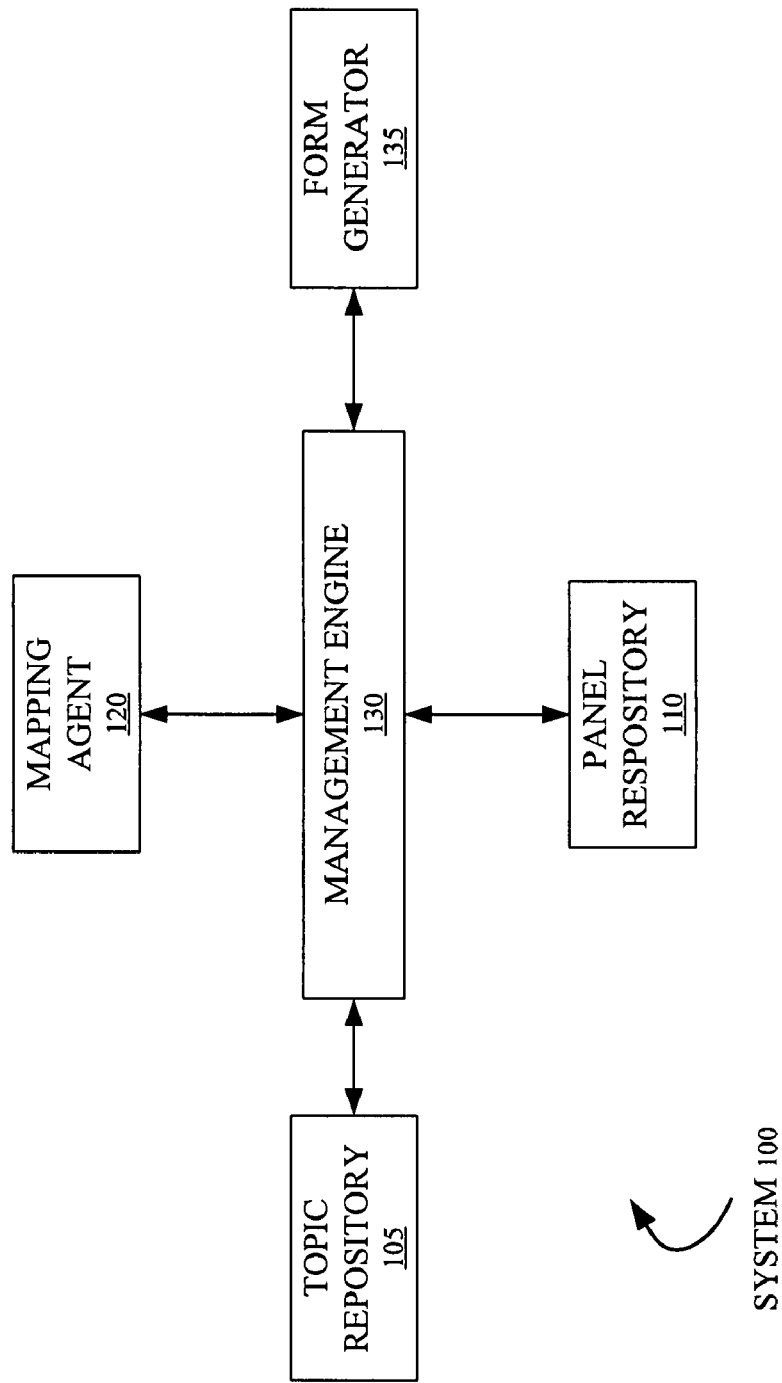
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for predictive form completion. In general, embodiments of the invention provide a method and system for predictive form completion using panels, panel relevance ratings, and one or more mapping rules.

As discussed above, a form may be used to report one or more topics (e.g., financial topics, maintenance topics, and/or other topics). In other words, one or more topics may appear on a form to convey information. A form may be an electronic version of a paper form, a wizard style interface (i.e., a step-by-step sequence of questions with subsequent answer collection), a sequence of graphical elements on a display screen for guiding the user (i.e., an interactive tutorial), etc.

FIG. 1 shows a system (100) in accordance with one or more embodiments of the invention. As shown in FIG. 1, system (100) has multiple components including a topic repository (105), a panel repository (110), a mapping agent (120), a form generator (135), and a management engine (130). Each of these components are described below and may be located on the same device (e.g., a server, mainframe, desktop PC, laptop, PDA, television, cable box, satellite box, kiosk, telephone, mobile phone, etc.) or may be located on separate devices connected by a network (e.g., the Internet), with wired and/or wireless segments.

In one or more embodiments of the invention, the topic repository (105) stores one or more topics appearing on a form. The topic repository (105) may be a relational database, a flat file, or any other type of datastore. New topics may be added to the topic repository (105) and existing topics may be modified or deleted from the topic repository (105).

In one or more embodiments of the invention, the topic repository (105) stores one or more user profiles. A profile may be considered a group or collection of topics that describes a user. In one or more embodiments of the invention, the topic repository (105) includes predefined user profiles that can be customized to better describe the user. A user may customize a predefined profile by the adding and/or removing topics to/from the predefined profile.

In one or more embodiments of the invention, the panel repository (110) stores one or more panels for each topic in the topic repository (105). Additional panels may be added to the panel repository (110), while existing panels in the panel repository (110) may be modified or deleted. In one or more embodiments of the invention, new panels and/or updates to existing panels may be obtained from a website, accessible to the panel generator (110).

In one or more embodiments of the invention, a panel is configured to collect information regarding a topic from a user. The panel may present a question to the user and collect the user's response to the question. The user's response may include a numeric value and/or the manipulation of a GUI component (e.g., a checkbox, a set of radio buttons, a button, etc.). Those skilled in the art, having the benefit of this detailed description, will appreciate that some panels associated with one topic may present very broad questions regarding the topic. In contrast, other panels associated with the same topic may present very specific questions regarding the topic.

In one or more embodiments of the invention, some questions presented in a panel are irrelevant (e.g., not-applicable) to a user. Accordingly, the panel presenting the irrelevant question(s) may also be considered irrelevant to the user. In one or more embodiments of the invention, relevance ratings are assigned to panels. In other words, the relevance of a panel may be rated by a user, and this relevance rating may be assigned to the panel. The relevance rating may be a boolean value (i.e., 'true'/'false', 'yes'/'no', 'applicable'/'not-applicable', etc.). A panel that is deemed relevant may be assigned a positive relevance rating (e.g., 'true', 'yes', 'applicable', etc.). A panel that is deemed irrelevant may be assigned a negative relevance rating (e.g., 'false', 'no', 'not-applicable', etc.). Alternatively, the relevance rating may be an integer value to define the level of relevance (e.g., '1' may be considered low relevance and '10' may be considered high relevance).

In one or more embodiments of the invention, the mapping agent (120) is configured to predict panels that are relevant to the user. The predictions may be based on one or more previously presented panels and the relevance rating assigned to the one or more previously presented panels. In one or more embodiments of the invention, the mapping agent (120) uses one or more mapping rules for predicting relevant panels. A mapping rule may be considered a function that accepts one or more previously presented panels and the relevance ratings assigned to these previous presented panels as input. Further, a mapping rule may be considered a function that generates an output used for selecting a panel. In one or more embodiments of the invention, a mapping rule belongs to a set of mapping rules associated with a topic and/or a profile (e.g., a predefined profile).

In one or more embodiments of the invention, the mapping agent (120) is configured to monitor (e.g., gather statistics) the success of predicted panels. In other words, the mapping agent (120) may be configured to track which panels, initially predicted as relevant, are assigned a positive relevance rating by the user. The mapping agent (120) may also be able to track the frequency of these positive ratings.

In one or more embodiments of the invention, a set of mapping rules is stored in the mapping agent (120) and/or stored at a remote site (e.g., a website) accessible by the mapping agent (120). In one or more embodiments of the invention, a mapping rule is dynamic. In other words, a mapping rule may be modified for future use and/or future users. For example, a mapping rule that initially predicts one panel to be relevant following a sequence of panel relevance ratings may be adjusted to predict a different panel to be relevant following the same sequence of panel relevance ratings (discussed below).

In one or more embodiments of the invention, the form generator (135) is configured to complete forms and/or form sections using information collected by one or more panels. Each form in the form generator (135) may be associated with one or more topics in the topic repository (105). In other words, one or more topics from the topic repository (105) may appear on a form generated by the form generator (135). The forms may be stored in the form generator (135) or may be stored at a remote site (e.g., a website) (not shown) accessible to the form generator (135).

In one or more embodiments of the invention, the management engine (130) provides an interface to the topic repository (105), the mapping agent (120), the panel repository (110), and the form generator (135). The management engine (130) may be configured to accept input (e.g., keyboard input, cursor input, voice commands, etc.) from a user via a (GUI), and produce outputs for the user (e.g., on a display screen, printer, audio speakers, etc.).

Figure 2:
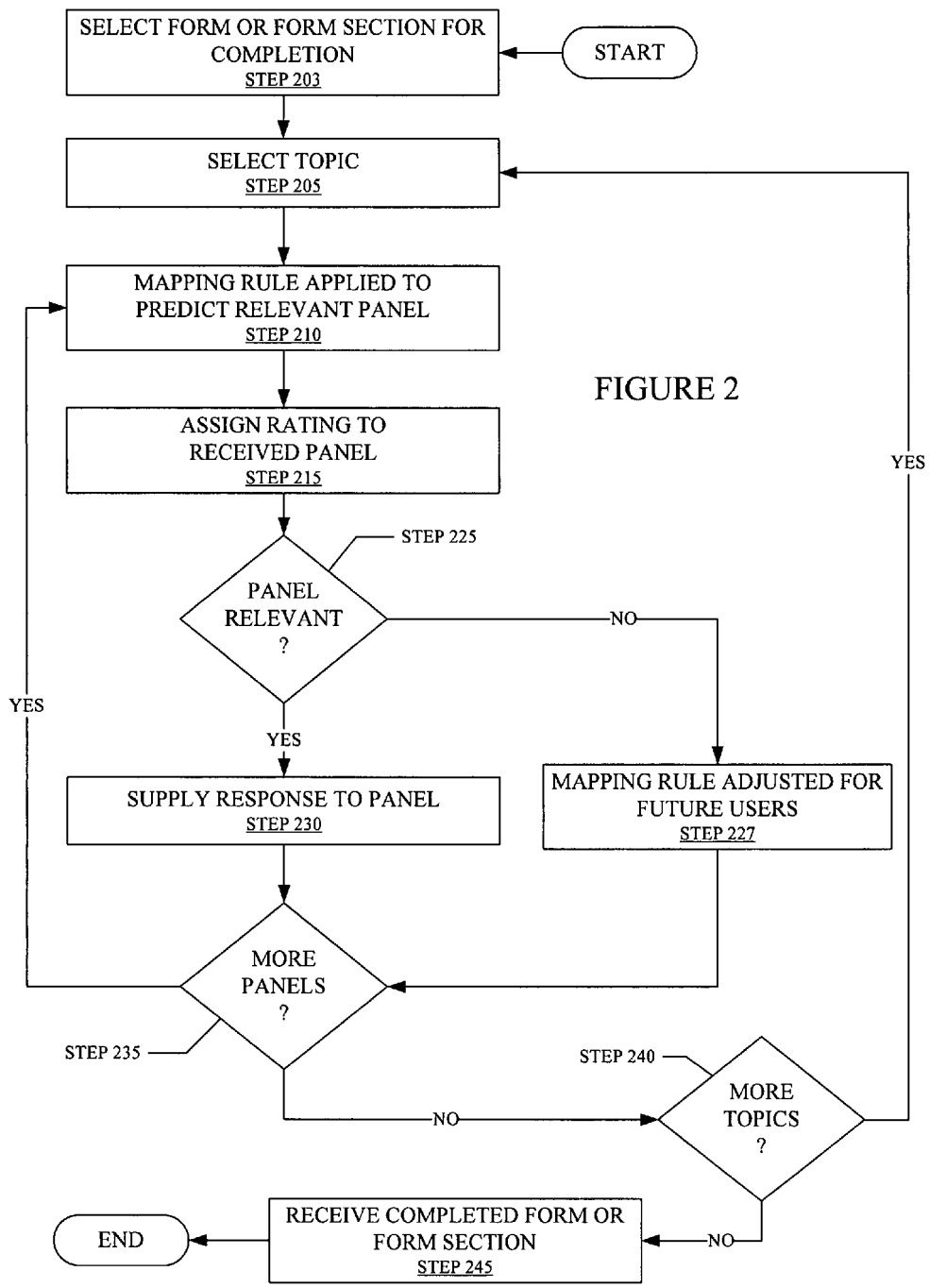
FIG. 2 shows a flowchart in accordance with one or more embodiments of the invention.

FIG. 2 shows a flowchart in accordance with one or more embodiments of the invention. The steps of the flowchart shown in FIG. 2 may be used to complete a form and/or a form section. Those skilled in the art, having the benefit of this detailed description, will appreciate the order and number of steps shown in FIG. 2 may differ among embodiments of the invention.

In STEP 203, a form or form section is selected for completion. In one or more embodiments of the invention, a form or form section is selected by a user (e.g., from a list, drop-down box, etc.). As discussed above, a form or form section may include one or more topics.

In STEP 205, a topic associated with the form or form section is selected. When STEP 205 is reached from STEP 203, the selected topic may be considered a seed topic for use in completing the selected form or form section. In other words, a seed topic may be considered a starting point in the process of completing the selected form or form section. In one or more embodiments of the invention, the seed topic is directly selected by a user (e.g., from a list, a drop-down box, etc.) once the form or form section is selected (STEP 203). In one or more embodiments of the invention, the topic is selected automatically based on a profile chosen by a user and/or at random.

In STEP 210, a mapping rule is applied to predict a relevant panel. The predicted relevant panel is received by the user. The mapping rule may belong to a set of mapping rules associated with the selected topic (STEP 205). When STEP 210 is reached from STEP 205, the mapping rule is applied to the selected seed topic to predict a relevant panel. In one or more embodiments of the invention, when STEP 210 is reached from STEP 235, (discussed below), the mapping rule uses one or more previously presented panels and/or the one or more ratings assigned to the previously presented panels to predict a relevant panel.

In STEP 215, the received predicted relevant panel is assigned a relevance rating. As discussed above, the relevance rating assigned to a panel may reflect the relevance of the question(s) presented by the panel. The relevance rating assigned to the panel may be a boolean value (e.g., 'true'/'false', 'yes'/'no', 'applicable'/'not-applicable', etc.) or an integer value (e.g., '1', '2', '10'). The relevance rating may be applied, for example, using GUI controls (e.g., buttons).

In STEP 225, when a determination is made that a positive relevance rating is assigned to the panel (i.e., the panel is considered relevant to the user), the process proceeds to STEP 230. When a determination is made that a negative relevance rating is assigned to the panel (i.e., the panel is considered irrelevant to the user), the process proceeds to STEP 227.

In STEP 230, the user supplies a response to the obtained panel. As discussed above, a panel may present a question to the user. The user's response may be collected and used to complete the selected form and/or form section. A response to the panel may be supplied by entering numbers and/or manipulating GUI components (i.e., marking checkboxes, selecting radio boxes, pushing buttons, entering text in textboxes, etc.).

In STEP 227, the mapping rule used to predict the panel (STEP 210) is adjusted for future use and/or future users. As discussed above, STEP 227 is reached when the panel predicted as relevant by the mapping rule is assigned a negative relevance rating (STEP 215). Accordingly, the mapping rule may be adjusted to predict a different panel when essentially the same inputs are obtained in the future. Those skilled in the art, having the benefit of this detailed description, will appreciate that STEP 227 is optional. In one or more embodiments of the invention, STEP 227 is only executed after a specific number of negative relevance ratings have been assigned to the panel received in STEP 210.

In STEP 235, a determination is made whether there exists at least one panel, associated with the selected topic (STEP 205), that has not yet been presented to the user. When such a panel does exist, the process proceeds to STEP 210 (discussed above). When all panels associated with the selected topic have been presented to the user, the process proceeds to STEP 240.

In STEP 240, a determination is made whether there exists at least one topic, reported by the selected form or form section (STEP 203), for which no panels have been presented to the user. When such a topic exists, the process returns to STEP 205. When no such topics exist, the process proceeds to STEP 245.

In STEP 245, the completed form or form section is received by the user. The completed form or form section may be viewed, stored, printed, and/or transmitted electronically to a third-party (e.g., via the Internet) in any format required. The completed form or form section may be directly modified by the user.

Although FIG. 2 shows the step of selecting a form or form section for completion (i.e., STEP 203) prior to the step of selecting of a topic (i.e., STEP 205), those skilled in the art, having the benefit of this detailed description, will appreciate that a seed topic may be selected prior to the form or form section. Once a seed topic has been selected, only a form and/or form section reporting at least the seed topic may be made available for selection.

In one or more embodiments of the invention, one of the topics in a profile (discussed above) is a default seed topic. Accordingly, when the user has selected a profile, selection of a seed topic (i.e., STEP 205) may be automatic. Similarly, when the user has selected a profile, the order in which addition topics are selected (i.e., STEP 205 following STEP 240) may also be predefined. In one or more embodiments of the invention, the set of mapping rules used to predict a relevant panel (i.e., STEP 215) may be associated with both the selected topic (as discussed above) and/or the selected profile.

Although the steps in FIG. 2 have been described from a user perspective, those skilled in the art, having the benefit of this detailed description, will appreciate the system perspective essentially mirrors the steps shown in FIG. 2. For example, in STEP 205, a user may select a topic. In contrast, the system may receive the selected topic. Similarly, the system may apply a mapping rule to predict the relevant panel, the system may display the predicted relevant panel, the system may receive a relevance rating assigned to the displayed predicted panel, the system may collect a response to the predicted panel, the system may adjust the mapping rule based on the relevance rating assigned to the predicted panel, and the system may complete the form or form section based on the response collected from the user.

Figure 3A:
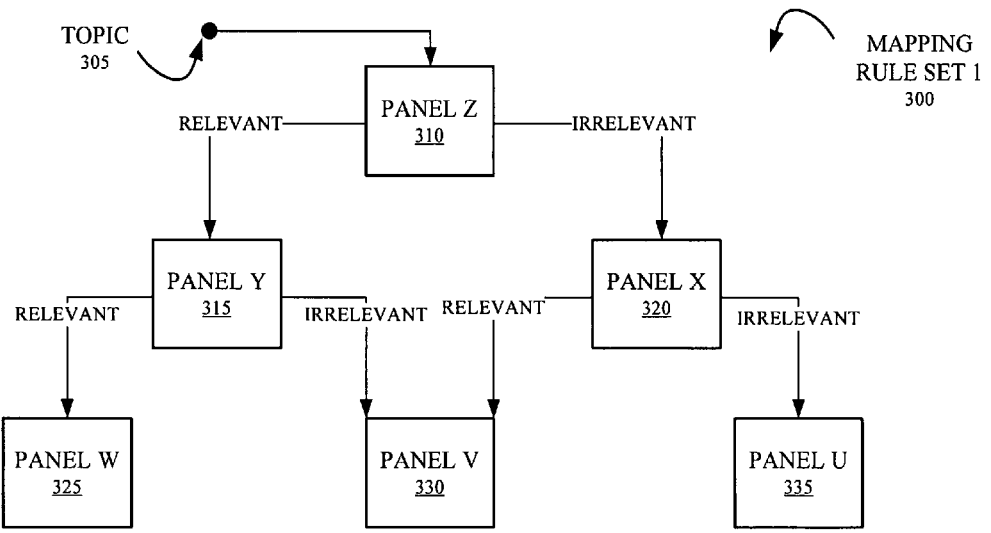
FIGS. 3A, 3B, 4A, and 4B show sets of mapping rules in accordance with one or more embodiments of the invention.

FIG. 3A shows a set of mapping rules (i.e., Mapping Rule Set 1 (300)) in accordance with one or more embodiments of the invention. The mapping rule set 1 (300) may be associated with a predefined user profile. As shown in FIG. 3A, the mapping rule set 1 (300) stems from a topic (305). Those skilled in the art, having the benefit of this detailed description, will appreciate that each of Panel Z (310), Panel Y (315), Panel X (320), Panel W (325), Panel V (330), and Panel U (335) are associated with at least the topic (305). The mapping rule set 1 (300) establishes which panels are predicted as relevant based on previously presented panels and the relevance ratings (i.e., 'relevant'/'irrelevant') assigned to the previously presented panels.

For example, as shown in FIG. 3A, Panel Y (315) is presented when Panel Z (310) is deemed to be relevant by the user (i.e., assigned a positive relevance rating). Similarly, Panel W (325) is presented when Panel Y (315) is deemed to be relevant by the user, and Panel V (330) is presented when Panel X (320) is deemed to be relevant by the user. In contrast, Panel X (320) is presented when Panel Z (310) is deemed to be irrelevant by the user (i.e., assigned a negative relevance rating), Panel V (330) is presented when Panel Y (315) is deemed to be irrelevant by the user, and Panel U (335) is presented when Panel X (320) is deemed to be irrelevant to the user.

Figure 3B:
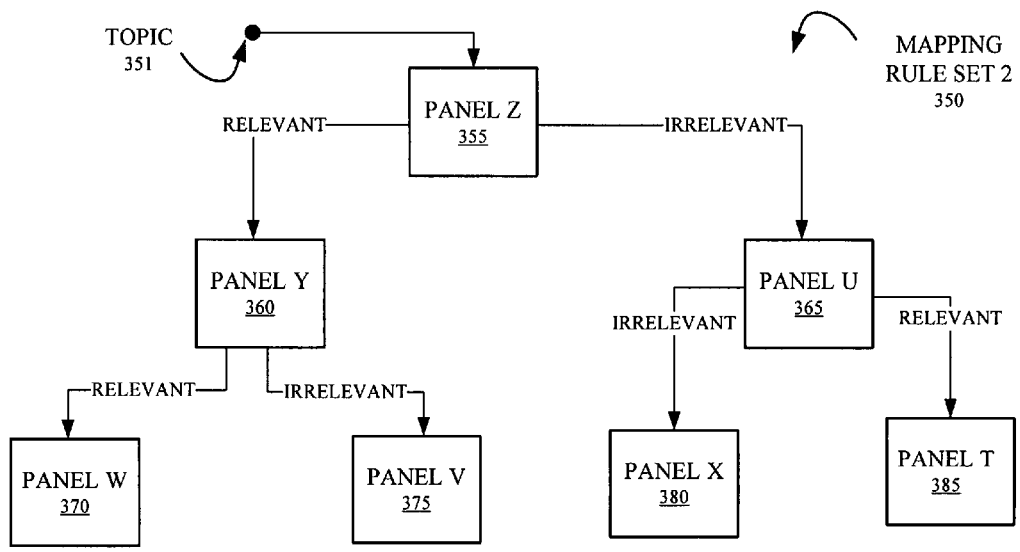

When two sets of mapping rules are associated with different user profiles, although the two set of mapping rules may stem from essentially the same topic, the two sets of mapping rules may predict different panels as relevant despite similar inputs. For example, FIG. 3B shows a set of mapping rules (i.e., Mapping Rule Set 2 (350)) in accordance with one or more embodiments of the invention. The mapping rule set 2 (350) may be associated with a different user profile than the mapping rule set 1 (300), discussed above in reference to FIG. 3A. The topic (351) may be essentially the same as topic (305), discussed above in reference to FIG. 3A. Panel Z (355), Panel Y (360), Panel U (365), Panel W (370), Panel V (375), and Panel X (380) may be essentially the same as Panel Z (310), Panel Y (315), Panel U (335), Panel W (325), Panel V (330), and Panel X (320) respectively, discussed above in reference to FIG. 3A. However, in FIG. 3B, Panel U (365) is predicted as relevant when Panel Z (355) is deemed relevant (i.e., assigned a positive relevance rating). This differs from what is shown in FIG. 3A. Similarly, still referring to FIG. 3B, Panel T (380) is predicted as relevant when Panel U (365) is deemed relevant (i.e., assigned a positive relevance rating). This also differs from what is shown in FIG. 3A.

Figure 4A:
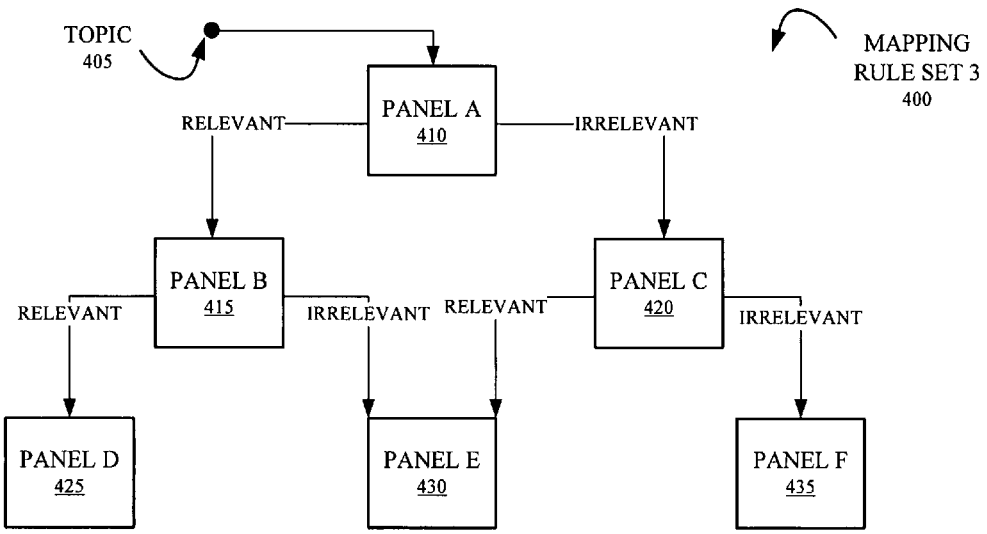

FIG. 4A shows a set of mapping rules (i.e., Mapping Rule Set 3 (400)) in accordance with one or more embodiments of the invention. As shown in FIG. 4A, the mapping rule set 3 (400) stems from a topic (405). Those skilled in the art, having the benefit of this detailed description, will appreciate that each of Panel A (410), Panel B (415), Panel C (420), Panel D (425), Panel E (430), and Panel F (435) are associated with at least the topic (405). The mapping rule set 3 (400) establishes which panels are predicted as relevant based on previously presented panels and the relevance ratings (i.e., 'relevant'/ 'irrelevant') assigned to the previously presented panels.

For example, still referring to FIG. 4A, Panel B (415) is presented when Panel A (410) is deemed to be relevant by the user (i.e., assigned a positive relevance rating). Similarly, Panel D (425) is presented when Panel B (415) is deemed to be relevant by the user, and Panel E (430) is presented when Panel C (420) is deemed to be relevant by the user. In contrast, Panel C (420) is presented when Panel A (410) is deemed to be irrelevant by the user (i.e., assigned a negative relevance rating), Panel E (430) is presented when Panel B (415) is deemed to be irrelevant by the user, and Panel F (435) is presented when Panel C (420) is deemed to be irrelevant to the user.

As discussed above, when Panel A (410) is deemed relevant by the user, the set of mapping rules predicts Panel B (415) will be relevant to the user. In one or more embodiments of the invention, after one or more applications of the mapping rules, it may be determined that Panel B (415) is frequently deemed irrelevant to the user (i.e., contrary to what is predicted by the mapping rule). Accordingly, one or more mapping rules may be adjusted to improve prediction performance.

Figure 4B:
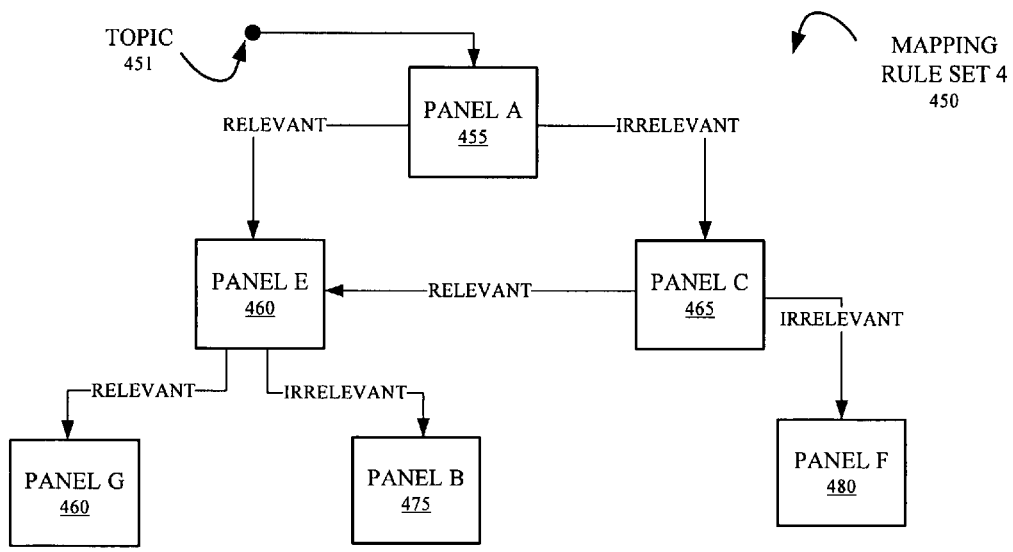

FIG. 4B shows a set of mapping rules (i.e., Mapping Rule Set 4 (450)) in accordance with one or more embodiments of the invention. The mapping rule set 4 (450) may be essentially considered the mapping rule set 3 (400) following an adjustment. The topic (451), Panel A (455), Panel B (475), Panel C (465), Panel E (460), and Panel F (480) may be essentially the same as the topic (405), Panel A (410), Panel B (415), Panel C (420), Panel E (430), and Panel F (435), respectively, discussed above in reference to FIG. 4A. However, as shown in FIG. 4B, when Panel A (455) is deemed relevant by the user, Panel E (460) is predicted as a relevant panel to the user. Those skilled in the art, having the benefit of this detailed description, will appreciate the set of inputs (i.e., the previously presented panels and relevance ratings assigned to the previously presented panels) that predicted Panel B (415) in FIG. 4A, now predict Panel E (460) in FIG. 4B.

Although FIGS. 3A, 3B, 4A, and 4B show sets of mapping rules implemented as trees, or tree like structures, those skilled in the art, having the benefit of this detailed description, will appreciate that a set of mapping rules may be implemented in any manner, including implementations using decision trees, set theory, fuzzy logic, probabilistic techniques, etc.

Figure 5:
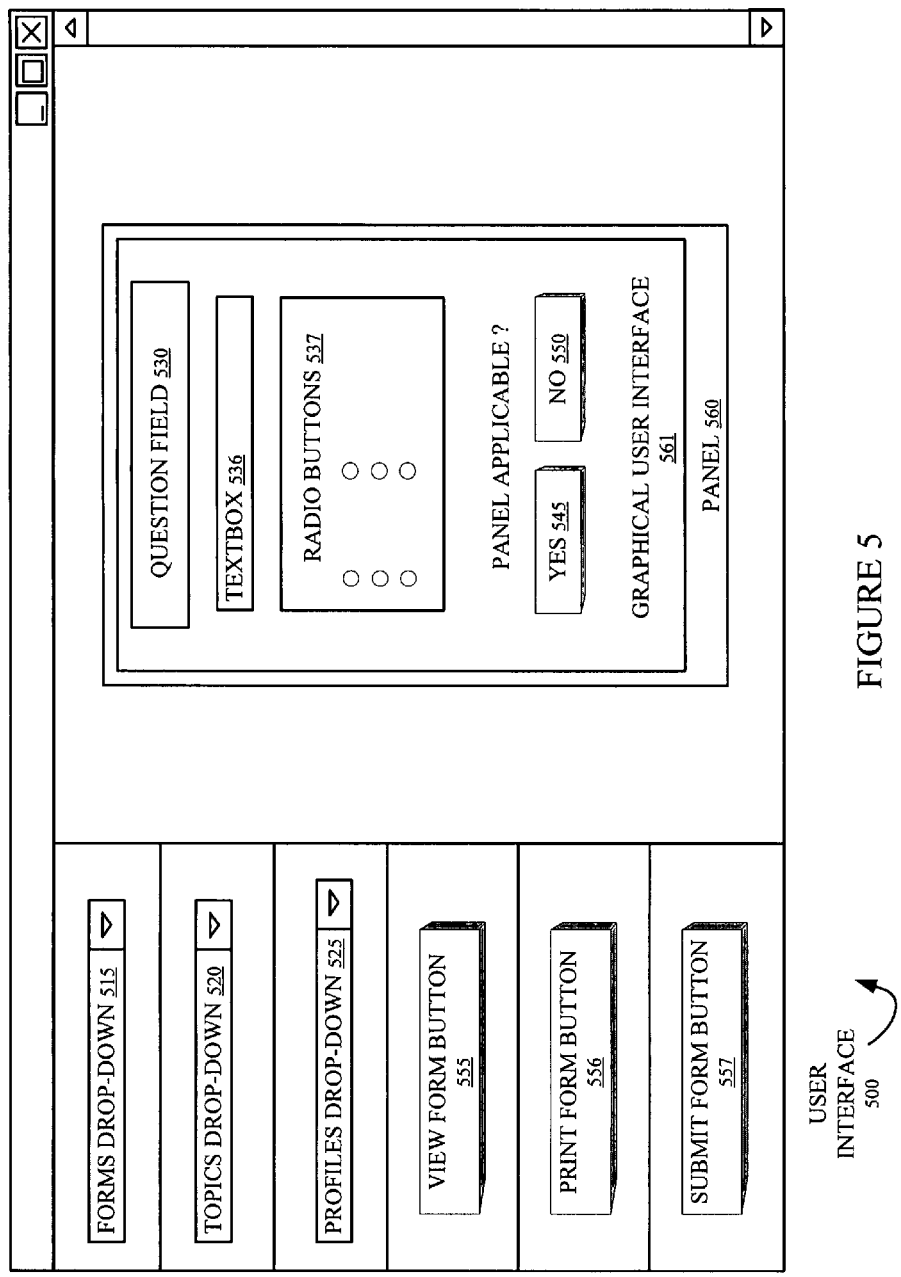
FIG. 5 shows an example graphical user interface (GUI) in accordance with one or more embodiments of the invention.

FIG. 5 shows an example user interface (500) in accordance with one or more embodiments of the invention. As shown in FIG. 5, the user interface (500) has numerous components including one or more drop-down lists (i.e., Forms Drop-Down (515), Topic Drop-Down (520), Profiles Drop-Down (525)), one or more buttons (e.g., View Form Button (555), Print Form Button (556), Submit Form Button (557)), and at least one panel (i.e., Panel (560)). The panel (560) may have numerous components including one or more push buttons (i.e., Yes (545), No (550)), multiple radio buttons (537), a textbox (536), and a question field (530). The one or more push buttons (i.e., Yes (545), No (550)), the multiple radio buttons (537), the textbox (536), and the question field (530) may be associated with a graphical user interface (561).

In one or more embodiments of the invention, the form drop-down (515) is used to select a form or a section of a form to complete. Similarly, the topics drop-down (520) is used to select a topic appearing on the selected form or form section. In one or more embodiments of the invention, the profiles drop-down (525) is used to select and/or customize a pre-defined profile describing the user of the user interface (500).

In one or more embodiments of the invention, the view form button (555) is used to access and directly edit the completed form or form section. Similarly, the print form button (556) is used to print the completed form or form section. In one or more embodiments of the invention, the submit form button (557) is used to electronically transmit the completed form or form section to a third party (i.e., another user, another application, a regulatory body, etc.). The form may be transmitted in any format required by the third party.

In one or more embodiments of the invention, the question field (530) is used to present one or more questions to the user. The textbox (536) and the radio buttons (537) may be used to supply a response to the one or more questions. Although the panel (560) shown in FIG. 5 has the textbox (536) and the radio buttons (537), those skilled in the art, having the benefit of this detailed description, will appreciate that any type of GUI component may be used to supply a response to the one or more questions.

In one or more embodiments of the invention, the panel (560) includes one or more buttons (i.e., Yes (545), No (550)). The one or more buttons may be used to assign a positive or negative relevance rating to the panel. Those skilled in the art, having the benefit of this detailed description, will appreciate various types of GUI components (e.g., sliders, checkboxes, etc.) may be used to assign a relevance rating to the panel (560).

Those skilled in the art, having the benefit of this detailed description, will appreciate that one or more embodiments of the invention may be used to complete financial forms (e.g., incorporation forms, merger forms, employment application forms, tax forms, etc.) and/or sections of these financial forms. A financial form may report one or more financial topics. A financial topic may be considered any transaction or life event that has a financial impact. Example life events include getting married, having children, enrolling in higher education, purchasing a home, etc. Example transactions include earning income through employment, trading securities, saving for retirement, paying insurance premiums, charitable deductions, automobile payments, etc.). When a financial form or section of a financial form is completed, it may be transmitted to a financial third party (e.g., a tax authority).

Those skilled in the art, having the benefit of this detailed description, will appreciate that one or more embodiments of the invention may be used to complete maintenance forms (e.g., airplane maintenance checklists, building inspection forms, automobile smog test forms, etc.). A maintenance form may report one or more maintenance topics. A maintenance topic may be considered any activity that involves searching for, diagnosing, and/or repairing flaws or defects in a physical object.

Figure 6:
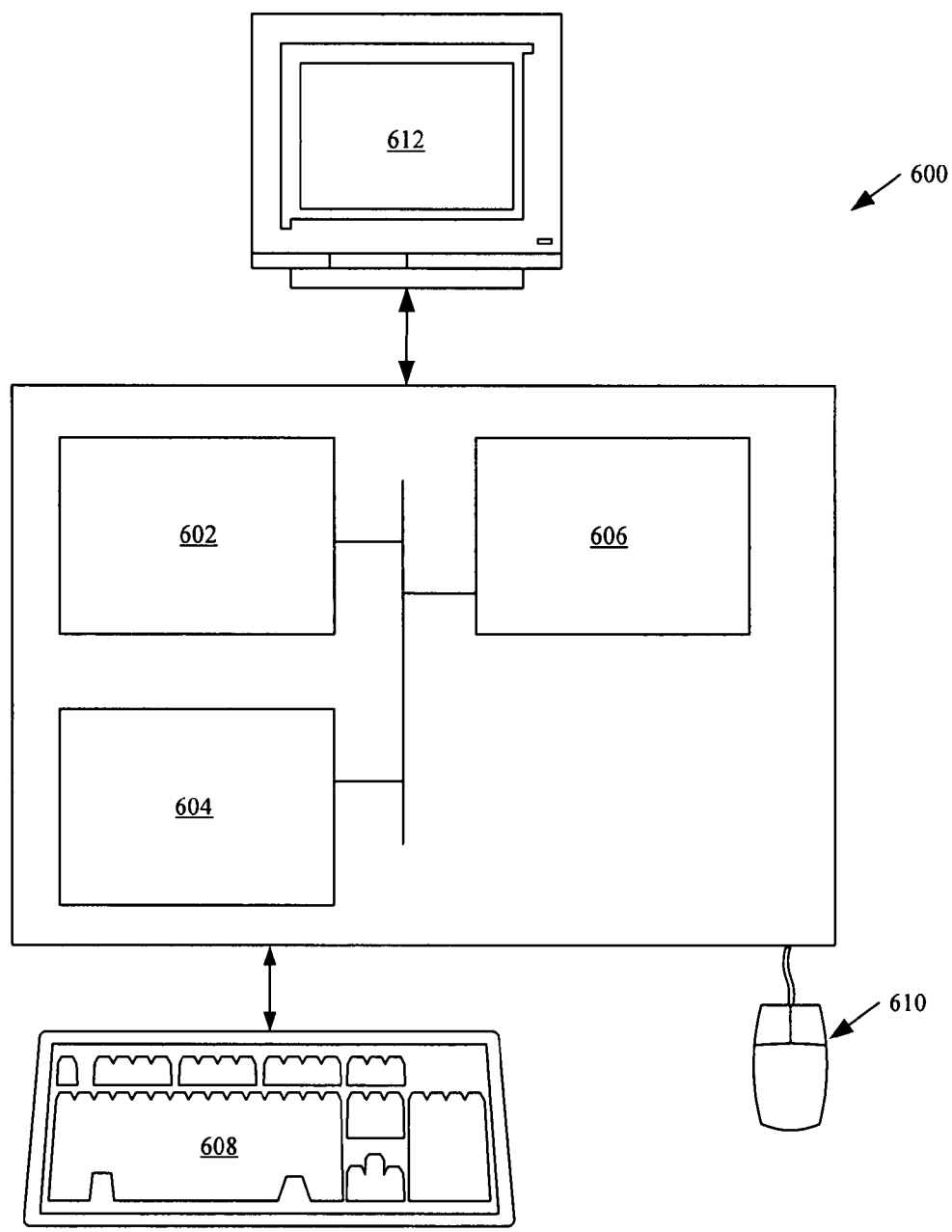
FIG. 6 shows a computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown).

Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., panel generator, mapping agent, form generator, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for completing a form comprising:
   receiving, from a first user, a selected first topic appearing on the form;
   displaying, for the first user, a first panel within a graphical user interface (GUI), wherein the first panel poses a first question regarding the selected first topic;
   receiving, from the first user, a first panel relevance rating assigned to the first panel;
   generating a first output by applying a mapping rule to the selected first topic and the first panel relevance rating;
   selecting, based on the first output, a second panel posing a second question regarding the selected first topic;
   displaying the second panel for the first user;
   receiving, from the first user, a second panel relevance rating assigned to the second panel, wherein the second panel relevance rating is a negative relevance rating;
   adjusting, in response to the negative relevance rating, the mapping rule to generate an adjusted mapping rule;
   receiving, from a second user and after adjusting the mapping rule, the selected first topic appearing on the form;
   displaying the first panel for the second user and after adjusting the mapping rule;
   receiving, from the second user and after adjusting the mapping rule, the first panel relevance rating assigned to the first panel;
   collecting, from the second user, a response to the first question posed by the first panel;
   generating a second output by applying the adjusted mapping rule to the selected first topic and the first panel relevance rating;
   selecting, in response to the second output, a third panel posing a third question regarding the first selected topic;
   displaying the third panel for the second user;
   receiving, from the second user, a third panel relevance rating for the third panel;
   collecting, from the second user, a response to the third question; and
   completing the section of the form based on the response to the first question and the response to the third question.

2. The method of claim 1, further comprising:
   displaying the section of the form after completing the section.

3. The method of claim 1, further comprising:
   predicting a fourth panel based on the selected first topic, the first panel relevance rating, and the third panel relevance rating; and
   receiving a fourth panel relevance rating assigned to the fourth panel.

4. The method of claim 1, further comprising:
   receiving a selected second topic appearing on the form;
   displaying a second topic panel within the GUI, wherein the second topic panel poses a second topic question and is associated with the selected second topic;
   receiving a second topic panel relevance rating assigned to the second topic panel; and
   collecting a response to the second topic question, wherein completing the section is further based on the response to the second topic question.

5. The method of claim 1, wherein the mapping rule belongs to a set of mapping rules associated with the selected first topic.

6. A computer readable medium storing instructions for completing a form, the instructions comprising functionality to:
   receive, from a first user, a selected first topic appearing on the form;
   display, for the first user, a first panel within a graphical user interface (GUI), wherein the first panel poses a first question regarding the selected first topic;
   receive, from the first user, a first panel relevance rating assigned to the first panel;
   generate a first output by applying a mapping rule to the selected first topic and the first panel relevance rating;
   select, based on the first output, a second panel posing a second question regarding the selected first topic;
   display the second panel for the first user;
   receive, from the first user, a second panel relevance rating assigned to the second panel, wherein the second panel relevance rating is a negative relevance rating;
   adjust, in response to the negative relevance rating, the mapping rule to generate an adjusted mapping rule;
   receive, from a second user and after adjusting the mapping rule, a selected first topic appearing on the form;
   display, for the second user and after adjusting the mapping rule, the first panel posing a first question;
   receive, from the second user and after adjusting the mapping rule, the first panel relevance rating assigned to the first panel;
   collect, from the second user, a response to the first question posed by the first panel;
   generate a second output by applying the adjusted mapping rule to the selected first topic and the first panel relevance rating;
   select, in response to the second output, a third panel posing a third question regarding the selected first topic;
   display the third panel for the second user;
   collect, from the second user, a response to the third question; and
   complete the section of the form based on the response to the first question and the response to the third question.

7. The computer readable medium of claim 6, the instructions further comprising functionality to:
   predict a fourth panel based on the selected first topic, the first panel relevance rating, and the second panel relevance rating; and receive a fourth panel relevance rating assigned to the fourth panel.

8. The computer readable medium of claim 6, the instructions further comprising functionality to:
receive a selected second topic appearing on the form;
display a second topic panel within the GUI, wherein the second topic panel poses a second topic question and is associated with the selected second topic;
receive a second topic panel relevance rating assigned to the second topic panel; and
collect a response to the second topic question, wherein the section is completed further based on the response to the second topic question.

9. A system for completing a form comprising:
memory; and
a processor for executing:
  a panel repository storing a first panel comprising a first question regarding a topic on the form, a second panel comprising a second question regarding the topic, and a third panel comprising a third question regarding the topic;
  a mapping agent operatively connected to the panel repository and configured to:
    generate a first output by applying a mapping rule to the topic and a positive relevance rating assigned to the first panel, wherein the second panel is selected based on the first output;
    adjust the mapping rule, in response to a negative relevance rating assigned to the second panel, to generate an adjusted mapping rule, wherein the negative relevance rating is assigned by a first user;
    generate a second output by applying the adjusted mapping rule to the topic and the positive relevance rating, wherein the third panel is selected based on the second output,
    wherein the positive relevance rating is assigned by the first user and a second user; and
  a form generator operatively connected to the panel repository and configured to complete a section of the form based on a response to the first question from the second user and a response to the third question from the second user.

10. The system of claim 9, wherein the mapping rule and the adjusted mapping rule are stored in the mapping agent.

11. The system of claim 9, wherein the form is stored in the form generator.

12. The system of claim 9, wherein the form generator is further configured to electronically transmit the form.

13. The system of claim 9, wherein the first panel comprises a graphical user interface for use in collecting the response to the first question.

* * * * *